United States Patent
Hung et al.

(10) Patent No.: US 7,804,195 B2
(45) Date of Patent: Sep. 28, 2010

(54) POWER SUPPLY SYSTEM AND PROTECTION METHOD

(75) Inventors: Chun-Lung Hung, Taipei Hsien (TW); Wang-Chang Duan, Shenzhen (CN); Wen-Ming Chen, Shenzhen (CN); Tao Wang, Shenzhen (CN); Shi-Ming Zhang, Shenzhen (CN); Pei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 105 days.

(21) Appl. No.: 12/195,408

(22) Filed: Aug. 20, 2008

(65) Prior Publication Data

US 2009/0127935 A1 May 21, 2009

(30) Foreign Application Priority Data

Nov. 15, 2007 (CN) .......................... 2007 1 0202555

(51) Int. Cl.
H02J 7/00 (2006.01)
H02J 9/00 (2006.01)
(52) U.S. Cl. ....................................................... 307/66
(58) Field of Classification Search .................... 307/66
See application file for complete search history.

(56) References Cited

U.S. PATENT DOCUMENTS

| 5,784,626 | A | * | 7/1998 | Odaohara .................... 713/300 |
| 6,597,152 | B1 | | 7/2003 | Jacobs |
| 6,762,584 | B2 | | 7/2004 | Harvey |
| 7,315,955 | B2 | | 1/2008 | Yamazaki et al. |
| 2003/0201672 | A1 | * | 10/2003 | Stranberg et al. ............. 307/66 |
| 2006/0259280 | A1 | * | 11/2006 | Zaccaria ..................... 702/188 |

FOREIGN PATENT DOCUMENTS

CN 2596670 Y 12/2003

* cited by examiner

*Primary Examiner*—Fritz M Fleming
*Assistant Examiner*—Dru M Parries
(74) *Attorney, Agent, or Firm*—Frank R. Niranjan

(57) ABSTRACT

A power supply system for an electronic device includes a first and a second connector, a switch, and a controller. The first connector is used for connecting to a first power source. The second connector is used for connecting to a second power source, wherein the second power source is rechargeable. The switch establishes a connection between the first connector and the second connector so as to allow the first power source to charge the second power source. The controller detects a presence of the first power source and the second power source, and controls the switch to periodically establish the connection at the absence of the second power source, and to continuously establish the connection at the presence of the second power source.

19 Claims, 3 Drawing Sheets

POWER SUPPLY SYSTEM AND PROTECTION METHOD

BACKGROUND

1. Field of the Invention

Embodiments of the present disclosure generally relate to power supplies, and particularly to a system and method for coupling a battery and a power adapter.

2. Description of Related Art

Electronic products generally have batteries, such as Ni—H$_2$, Ni—Cd, or Li-on batteries. Additionally, these electronic products also have power adapters to connect to city power in order to charge the battery inside the portable electronic devices.

The electronic product and the batteries both have contact points to electrically connect with each other so as to provide power for the electronic products. However, the contact points of the batteries are usually close to each other. In practice, the contact points may contact with each other inadvertently causing a short circuit between the two contact points. Therefore, potential danger arises when contact points contact with each other inadvertently.

Therefore, a power supply system and protection method are needed in the industry to address the aforementioned deficiency.

SUMMARY

A power supply system for an electronic device includes a first and a second connector, a switch, and a controller. The first connector is used for connecting to a first power source. The second connector is used for connecting to a second power source, wherein the second power source is rechargeable. The switch establishes a connection between the first connector and the second connector so as to allow the first power source to charge the second power source. The controller detects a presence of the first power source and the second power source, and controls the switch to periodically establish the connection at the absence of the second power source, and to continuously establish the connection at the presence of the second power source.

Other advantages and novel features of the present disclosure will become more apparent from the following detailed description of preferred embodiment when taken in conjunction with the accompanying drawings.

DETAILED DESCRIPTION OF CERTAIN INVENTIVE EMBODIMENTS

Figure 1:
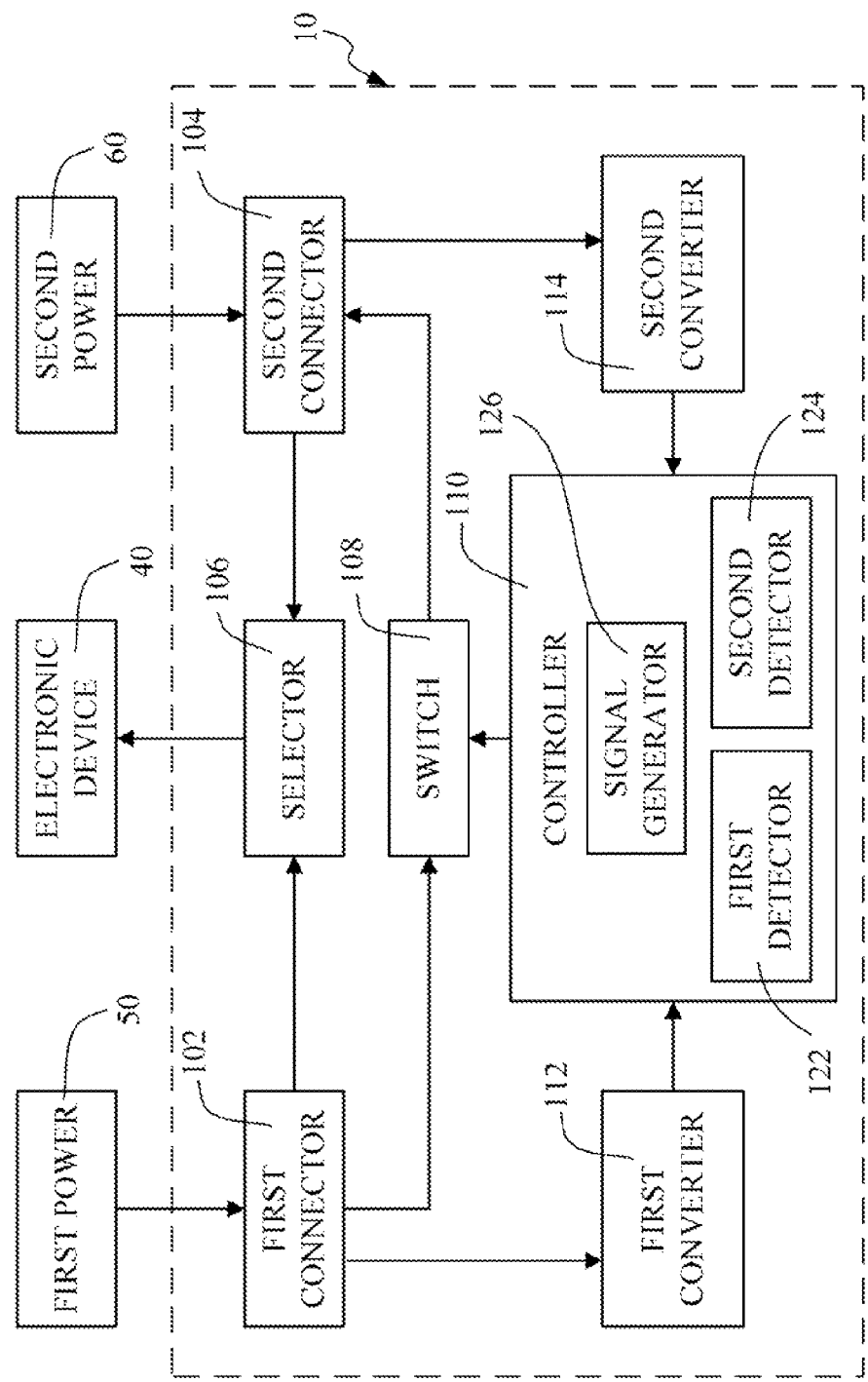
FIG. 1 is a block diagram of a power supply system in accordance with one exemplary embodiment of the present disclosure.

FIG. 1 is a block diagram of a power supply system 10 in accordance with one exemplary embodiment of the present disclosure. In one embodiment, the power supply system 10 includes a first connector 102, a second connector 104, a selector 106, a switch 108, a controller 110, a first converter 112, and a second converter 114.

The first connector 102 and the second connector 104 electrically connect to power sources such as power adapters, batteries, etc. In one embodiment, the first connector 102 may connect to an AC-DC adapter for receiving a first power 50, and the second connector 104 electrically connects to a battery for receiving a second power 60. The selector 106 is connected to the connectors 102, 104, for selectively delivering one of the first power 50 and the second power 60 to a connected electronic device 40.

The switch 108 is connected between the first connector 102 and the second connector 104 for establishing an electrical connection between the first connector 102 and the second connector 104. When an electrical connection is switched on, the first connector 102 receives the first power 50 to charge the battery connected to the second connector 104.

The first and second converters 112 and 114 are connected to the first connector 102 and the second connector 104 respectively, for converting the first power 50 and the second power 60 to a first signal and a second signal respectively.

The controller 110 controls the switch 108 if the first connector 102 is receiving the first power 50 and if the second connector 104 is receiving the second power 60. The controller 110 controls the switch 108 by detecting the first converter 112 and the second converter 114 for the first signal and the second signal respectively.

The controller 110 includes a first detector 122, a second detector 124, and a signal generator 126. The first detector 122 detects the first signal to determine if the first connector 102 is receiving the first power 50. The second detector 124 detects the second signal to determine if the second connector 104 is receiving the second power 60. The signal generator 126 generates a switch signal according to detection results of the detectors 122, 124. The switch 108 establishes the electrical connection between the connectors 102, 104 when receiving the switch signal.

Figure 2:
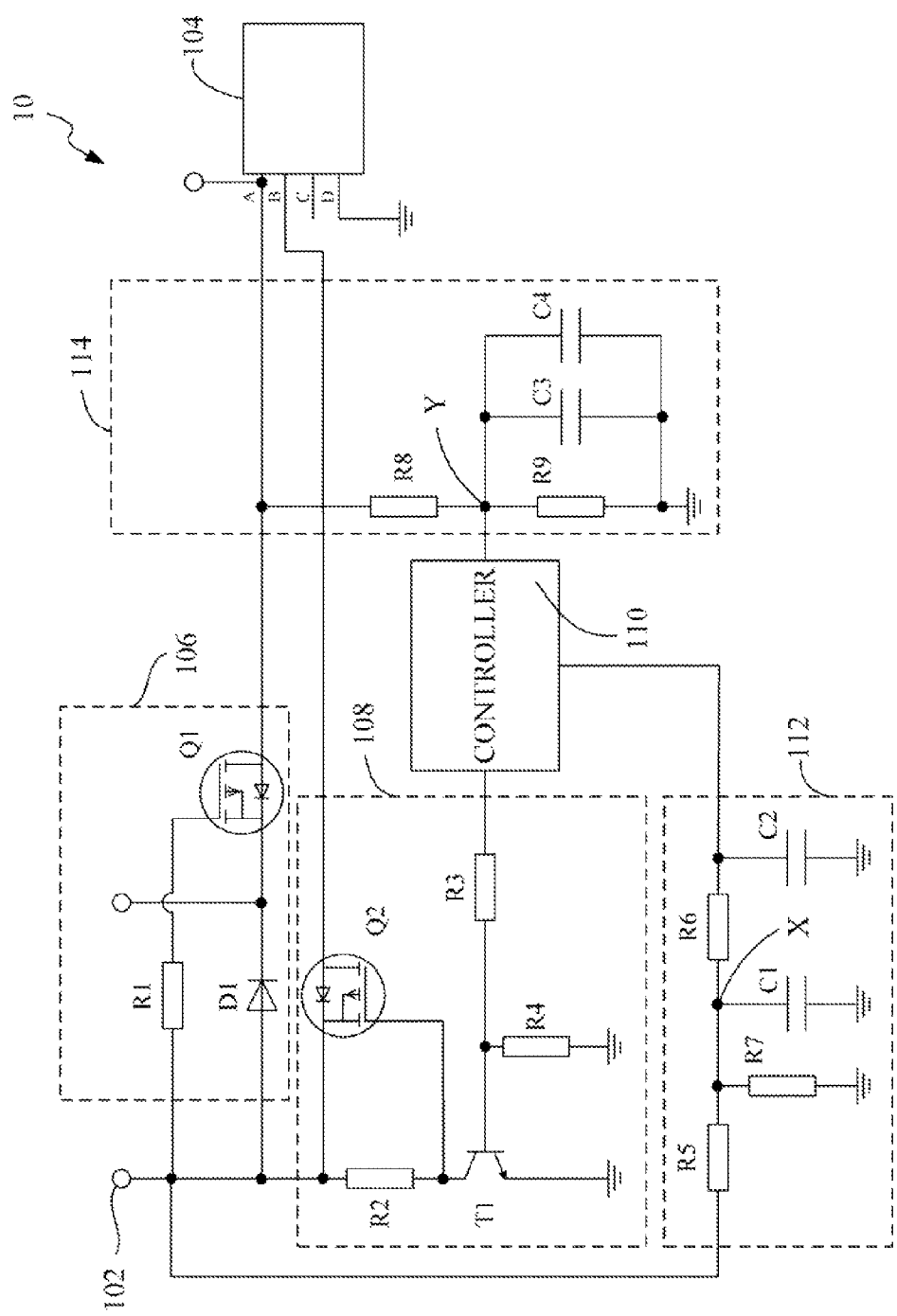
FIG. 2 illustrates one embodiment of a circuit diagram of the power supply system of FIG. 1.

FIG. 2 illustrates one embodiment of a circuit diagram of the power supply system 10 of FIG. 1. Commonly, a rechargeable battery has four pins for electrically connecting to an external device. The pins include a $V_{CC}$ pin, a control pin, a status pin, and a GND pin. The second connector 104 has four pins A-D that are used for connecting to the $V_{CC}$, control, status, and GND pins of the battery, respectively. The pin A of the second connector 104, connecting to the $V_{CC}$ pin of the battery, is used for providing power to an electrical device employing the rechargeable battery. The pin B of the second connector 104, connecting to the control pin of the battery, is used for enabling a rechargeable mode or a charge lock mode of the battery so as to prepare the battery to be charged.

The pin A of the second connector 104 and an output of the first connector 102 are connected to the selector 106, to selectively deliver the first power 50 or the second power 60 to the electronic device 40. In one embodiment, the selector 106 includes a resistor R1, a diode D1, and a switch element Q1. The first connector 102 is connected to the switch element Q1 through the resistor R1, while the pin A of the second connector 104 is directly connected to the switch element Q1. The switch element Q1 selectively outputs the first power 50 from the first connector 102 and the second power 60 from the second connector 104 through an output end of the switch element Q1. Preferably, the switch element Q1 is an insulated gate bipolar transistor (IGBT), the source of the IGBT is used as the output end, the gate of the IGBT is connected to the first connector 102 through the resistor R1, and the drain of the IGBT is connected to the second connector 104.

In one embodiment, the switch 108 includes three resistors R2, R3, R4, a bipolar junction transistor (BJT) T1, and an IGBT Q2. The collector of the BJT T1 is connected to the first connector 102 through the resistor R2, the base is connected to the controller 110 through the resistor R3, and the emitter is connected to ground. The base of the BJT T1 is further connected to ground through the resistor R4. The source of the IGBT Q2 is connected to the first connector 102, the drain is connected to the pin B of the second connector 104, and the gate of the IGBT Q2 is connected to the collector of the BJT T1.

In one embodiment, the first converter 112 includes three resistors R5, R6, R7, and two capacitors C1, C2. The first connector 102, the resistor R5, the resistor R6, and the controller 110 are connected in series. Each of the capacitors C1, C2 has one end connecting to ground, and another end connected to ends of the resistor R6 correspondingly. The resistor R7 is connected in parallel with the capacitor C1, between a node X between the resistors R5, R6 and ground.

In one embodiment, the second converter 114 includes two resistors R8, R9 that are connected in series, and two capacitors C3, C4. The pin A of the first connector 104 is connected to ground through the resistors R8, R9. The controller 110 is connected to a node Y between the resistors R8, R9. The capacitors C3, C4 are connected in parallel with the resistor R9 between the node Y and ground.

In one embodiment, the controller 110 can be a single chip machine, such as Zilog's Z8F0822. In one example, the first converter 112 is connected to pin 13 of the Z8F0822 (not shown), for detecting a presence of the first power 50. The second converter 114 is connected to pin 28 of Z8F0822, for detecting a presence of the second power 60. The pin 12 of Z8F0822 is connected to the switch 108. Accordingly, Z8F0822 generates the switch signal and sends out the switch signal through the pin 12. Other programmable logic may be incorporated as the present controller 110, as long as the switch signal can be generated according the voltage level of two input signals.

If the first power 50 is not detected (e.g., the first power 50 is not existent and indicating the first connector 102 is not connected to anything) and the presence of the second power 60 is detected (e.g., the second connecter 104 is connected to a battery), the switch element Q1 becomes conductive. Because the switch element Q1 is conductive, the output end provides the second power 60 from the battery to the electronic device 40. The diode D1 prevents currents from the pin A of the second connector 104 from flowing into the first connector 102. However, if the presence of the first power 50 is detected, indicating that the first connector 102 is connecting to an adapter, the switch element Q1 is non-conductive. If the switch element Q1 is non-conductive, the output end of the switch element Q1 provides the first power from the adapter to the electronic device 40, regardless if there is a battery connected to the second connector 104.

If the first power 50 is detected, the first power 50 from the first connector 102 is delivered to the controller 110 after being divided by the resistors R5, R6, R7, and filtered by the capacitors C1, C2. Thus, the first detector 122 of the controller 110 detects a first stable voltage indicating the presence of the first power 50. The controller 110 therefore generates the switch signal periodically. The switch signal drives the BJT T1 and the IGBT Q2 to be conductive. In this condition, if the second power 60 is presence, indicating the second connector 104 is connecting a battery, the signal from the drain of the IGBT Q2 is sent to the battery through the pin B of the second connector 104. Thus, the battery is enabled to the chargeable mode to allow the first power 50 from the first connector 102 to charge the battery. Once the battery is connected to the second connector 104, the power signal from the pin A is fed to the second detector 124 of the controller 110 after being divided by the resistors R8, R9, and filtered by the capacitors C3, C4. The controller 110 thus continuously generates the switch signal for allowing the battery to be continuously charged by the first power 50 from the first connector 102.

It is noted that even the pins of the second connector 104 are connected by accident, a short circuit would appear periodically, while not substantially affecting an electronic device employing the power supply system 10. Thus, the electronic device may be substantially protected from being damaged by shorted circuits. Additionally, the periodical switch signal can enable the rechargeable mode of the battery immediately when the battery is connected to the second connector 104, therefore allowing the first power 50 from the adapter to charge the battery quickly.

Figure 3:
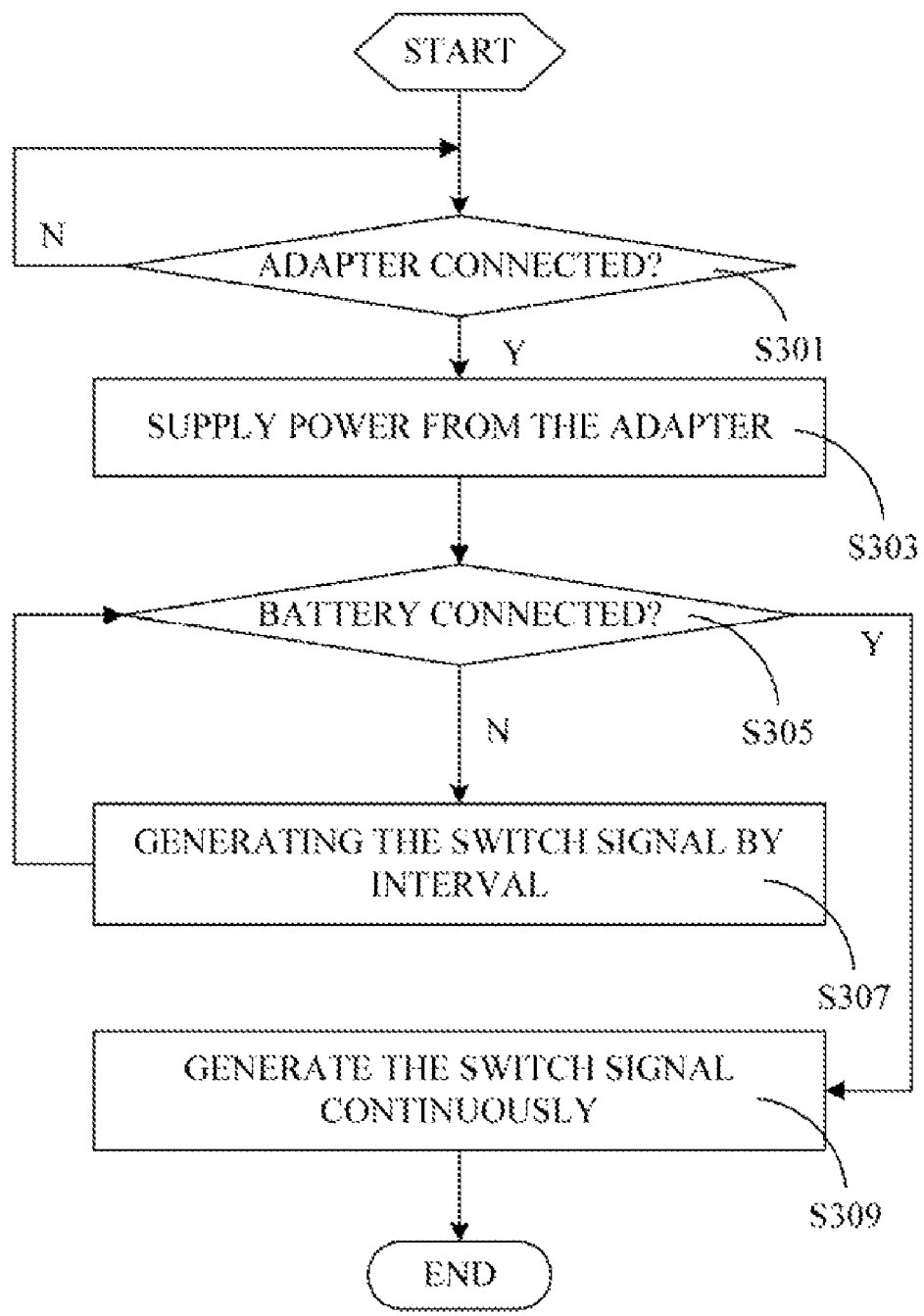
FIG. 3 is a flowchart of one embodiment of a protection method for a power supply system in accordance with the present disclosure.

FIG. 3 is a flowchart of one embodiment of a protection method for a power supply system in accordance with the present disclosure. The protection method of FIG. 3 may be used to charge an electrical device comprising a portable battery electrically coupled to a battery charger. Depending on the embodiment, additional blocks may be added, others deleted, and the ordering of the blocks may be changed.

In block S301, the presence of the first power 50 is continuously detected by the selector 106, for determining if an external power source, such as an adapter, is coupled in the power supply system 10 for providing power to the electronic device. As mentioned above, an external power source is coupled to the power supply system 10 if the presence of the first power 50 is detected.

In block S303, the first connector 102 provides the first power 50 from the external power source to an electronic device if the presence of the first power 50 is detected indicating an external power source is coupled to the power supply system 10.

In block S305, the selector 106 detects the presence of the second power 60, indicating if another chargeable power source, such as a battery, is coupled in.

In block S307, if an absence of the second power 60 is detected in the block S305, indicating that no chargeable power source is connected, the signal generator 126 of the controller 110 generates and sends out a switch signal periodically, for conducting the connection between the external power source and the second connecter 104. The switch signal is used for enabling the rechargeable mode of the possibly connected battery, therefore allowing the external power source to charge the chargeable power source. After the switch signal is sent, the flow may move back to block S305 to detect the presence of the chargeable power source. However, if the battery is still connected, then the flow may move back to block S301 where the presence of the first power 50 is continuously detected again by the selector 106.

In block S309, if the presence of the second power 60 is detected in the block S305, indicating that there is a chargeable power source being connected, the signal generator 126 of the controller 110 continuously generates and sends out the switch signal for enabling the rechargeable mode of the chargeable power source, therefore allowing the external power source to charge the chargeable power source.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A power supply system for an electronic device comprising:

a first connector for connecting to a first power source;

a second connector for connecting to a second power source, wherein the second power source is rechargeable;

a switch for establishing a connection between the first connector and the second connector so as to allow the first power source to charge the second power source, wherein the switch comprising a bipolar junction transistor with the base connected to the controller through a resistor, the collector being connected to the first connector through a resistor, and the emitter connecting to ground; and an insulated gate bipolar transistor with the source connecting to the first connector, the drain connecting to the second connector, and the gate connecting to the collector of the bipolar junction transistor; and a controller for detecting a presence of the first power source and the second power source, and controlling the bipolar junction transistor and the insulated gate bipolar transistor of the switch to periodically establish the connection at the absence of the second power source, and to continuously establish the connection at the presence of the second power source.

2. The power supply system according to claim 1, wherein the controller generates a switch signal to establish the connection between the first connector and the second connector.

3. The power supply system according to claim 2, wherein the controller generates the switch signal periodically at the presence of the first power source and an absence of the second power source.

4. The power supply system according to claim 2, wherein the controller comprises:
a first detector for detecting the presence of the first power source;
a second detector for detecting the presence of the second power source; and
a signal generator for generating the switch signal according to the detection of the first and second detectors.

5. The power supply system according to claim 1, further comprising:
a first converter for converting signals from the first connector into adaptive first signals for the controller; and
a second converter for converting the signals from the second connector into adaptive second signals for the controller.

6. The power supply system according to claim 1, further comprising a selector for selectively delivering the first power source or the second power source respectively connecting to the first or the second connector.

7. The power supply system according to claim 6, wherein the selector comprises a switch element having a first input connected to the first connector through a resistor, a second input connected to the second connector, and an output for supplying the power from either the first connector or the second connector.

8. The power supply system according to claim 7, wherein the selector further comprises a diode with the anode connected to the first connector and the cathode connected to the output of the switch element.

9. The power supply system according to claim 1, wherein the first power source is a power adapter.

10. The power supply system according to claim 1, wherein the second power source comprises a rechargeable battery.

11. A protection method for a power supply system capable of selectively providing either a first power source or a second rechargeable power source connected to the power supply system, the power supply system comprising a switch and a controller, the switch comprising a bipolar junction transistor with the base connected to the controller through a resistor, the collector being connected to the first power source through a resistor, and the emitter connecting to ground; and an insulated gate bipolar transistor with the source connecting to the first power source, the drain connecting to the second power source, and the gate connecting to the collector of the bipolar junction transistor, the protection method comprising:
the controller detecting a presence of the first power source;
the controller detecting a presence of the second power source at the presence of the first power source; and
the controller controlling the bipolar junction transistor and the insulated gate bipolar transistor of the switch periodically establishing a connection between the first power source and the second power source at an absence of the second power source.

12. The protection method according to claim 11, further comprising:
the controller controlling the bipolar junction transistor and the insulated gate bipolar transistor of the switch continuously establishing the connection between the first power source and the second power source at the presence of the second power source so as to allow the first power source to charge the second power source.

13. The protection method according to claim 11, wherein the power supply system further comprising a selector, the selector selectively delivers the first power source or the second power source respectively connecting to the power supply system.

14. The protection method according to claim 11, wherein the first power source is a power adapter.

15. The protection method according to claim 11, wherein the second power source comprises a rechargeable battery.

16. The protection method according to claim 13, further comprising:
the selector delivering the first power source at the presence of the first power source; or
the selector delivering the second power source at the presence of the second power source and an absence of the first power source.

17. An electronic device, comprising:
a first power source;
a second power source;
a switch for establishing a connection between the first power source and the second power source so as to allow the first power source to charge the second power source, wherein the switch comprising a bipolar junction transistor with the base connected to the controller through a resistor, the collector being connected to the first power source through a resistor, and the emitter connecting to ground; and an insulated gate bipolar transistor with the source connecting to the first power source, the drain connecting to the second power source, and the gate connecting to the collector of the bipolar junction transistor; and
a controller for detecting a presence of the first power source and the second power source, and controlling the bipolar junction transistor and the insulated gate bipolar transistor of the switch to periodically establish the connection at the absence of the second power source, and to continuously establish the connection at the presence of the second power source.

18. The electronic device of claim 17, wherein the electronic device further comprising a selector, the selector selectively delivers the first power source or the second power source respectively connecting to the electronic device.

19. The electronic device of claim 17, wherein the first power source is a power adapter.

* * * * *